United States Patent [19]
Saito et al.

[11] Patent Number: 5,796,560
[45] Date of Patent: Aug. 18, 1998

[54] MAGNETORESISTIVE HEAD

[75] Inventors: Kazuhiro Saito; Yuzo Kamiguchi, both of Yokohama; Hitoshi Iwasaki, Yokosuka; Susumu Hashimoto, Ebina; Hiromi Fuke, Kawasaki; Tomomi Funayama, Fujisawa, all of Japan

[73] Assignee: Kabushiki Kaisha Toshiba, Kawasaki, Japan

[21] Appl. No.: 614,146

[22] Filed: Mar. 12, 1996

[30] Foreign Application Priority Data

Mar. 13, 1995 [JP] Japan ................... 7-052617

[51] Int. Cl.$^6$ ............................................. G11B 5/39
[52] U.S. Cl. ............................................. 360/113
[58] Field of Search .................... 360/113, 121, 360/125, 126; 428/328, 469, 692, 694 T

[56] References Cited

U.S. PATENT DOCUMENTS

| | | | |
|---|---|---|---|
| 4,299,622 | 11/1981 | Kimira et al. | |
| 5,483,735 | 1/1996 | Postma et al. | 360/113 |
| 5,485,334 | 1/1996 | Nix et al. | 360/113 |
| 5,491,600 | 2/1996 | Chen et al. | 360/113 |
| 5,556,718 | 9/1996 | Motomura et al. | 360/113 |
| 5,574,605 | 11/1996 | Baumgart et al. | 360/113 |
| 5,589,221 | 12/1996 | Hiramoto et al. | 427/130 |
| 5,608,593 | 3/1997 | Kim et al. | 360/113 |
| 5,648,885 | 7/1997 | Nishioka et al. | 360/113 |
| 5,673,162 | 9/1997 | Saito | 360/113 |

FOREIGN PATENT DOCUMENTS 6-325934  11/1994  Japan.

OTHER PUBLICATIONS

Maruyama, et al., "A Yoke Magnetoresistive Head for High Track Density," Shingaku Giho, MR87-3 (1987), pp. 17–22.

Kamiguchi, et al., "Giant MR and Structure of CoFe/Cu Spin–Valve," Journal of Japan Applied Magnetics Society, vol. 17, No. S2, 1993, pp. 91–96.

Chen, et al., "Ternary NiFeX as Soft Biasing Film in a Magnetoresistive Sensor," J. Appl. Phys., vol. 69, No. 8, Apr. 1991, pp. 5631–5633.

*Primary Examiner*—Allen Cao
*Attorney, Agent, or Firm*—Finnegan, Henderson, Farabow, Garrett & Dunner, L.L.P.

[57] ABSTRACT

A magnetoresistive head is disclosed which uses a crystalline soft magnetic film as an undercoat for a giant magnetoresistive film provided with at least one pair of ferromagnetic films opposed to each other across a nonmagnetic intermediate layer or for an anisotropically magnetoresistive film. The crystalline soft magnetic film comprises a film which has as a main component thereof at least one element selected from the group consisting of Ni, Fe, and Co and simultaneously incorporates therein at least one element selected from the group consisting of Nb, Mo, V, W, Ti, Zr, Hf, and Ta and at least one element selected from the group consisting of Cr, Rh, Os, Re, Si, Al, Be, Ga, and Ge.

31 Claims, 5 Drawing Sheets

MAGNETORESISTIVE HEAD

BACKGROUND OF THE INVENTION

1. Field of the Invention

This invention relates to a magnetoresistive head to be used as in a magnetic disc device.

2. Description of the Related Art

Generally, the reading of information from a magnetic recording medium storing the information is implemented by a method which comprises moving a regenerating magnetic head possessed of a coil relative to the recording medium and causing the consequently generated electromagnetic induction to detect the voltage induced in the coil. It has been also known to use a magnetoresistive head (hereinafter referred to as "MR head") in effecting the reading of information.

The MR head mentioned above operates by virtue of the phenomenon that the electric resistance of a certain kind of ferromagnetic element varies proportionately to the intensity of an external magnetic field and has been finding recognition as a head of high sensitivity fit for the magnetic recording medium. In recent years, owing to the trend of magnetic recording media toward decreased sizes and increased capacities, the relative speeds between the regenerating magnetic heads and the magnetic recording media during the course of reading of information have been decreasing. The expectation for an MR head which is capable of extracting a large output in spite of a small relative speed, therefore, has been gaining in depth.

The MR head mentioned above is known in two types; the AMR head which uses a film of so-called Permalloy alloy or an Ni-Fe type alloy manifesting anisotropic magnetoresistance (hereinafter referred to as "AMR"), i.e. a phenomenon of producing a change in electric resistance depending on the angle formed between the direction of electric current and the direction of magnetization of a ferromagnetic layer and the GMR head which uses a spin valve film or an artificial lattice film having a laminated structure of a ferromagnetic layer and a nonmagnetic intermediate layer and manifesting giant magnetoresistance (hereinafter referred to as "GMR").

The AMR head operates on the principle that the resistivity, ρ<parallel>, existing when the input current (sense current) and the magnetization M are parallel to each other and the resistivity, ρ<perpendicular>, existing when they are perpendicular to each other are widely different, generally in this relationship, ρ<parallel>> ρ<perpendicular>. Let θ stand for the angle formed between the current i and the magnetization M, and the resistivity ρ of the AMR film will be expressed as follows.

$$\rho = \rho<parallel> \cos^2 \theta + \rho<perpendicular> \sin^2 \theta.$$

This resistivity ρ is changed as shown in FIG. 6. When the AMR head is adopted as a regenerating head, therefore, the largest magnetoresistivity can be obtained by inclining the angle θ to the neighborhood of 45 degrees.

As a concrete example of the structure of the AMR head, the structure shown in FIG. 7 |as published in Shingaku Giho, MR87-3 (1987), for example| may be cited. As shown in the diagram, an AMR film 1 is superposed through the medium of a nonmagnetic film 2 on a soft magnetic bias film 3. On the opposite terminal parts of the AMR film 1, antiferromagnetic bias films 4, 4 and terminals 5, 5 for feeding a sense current are superposed. When the sense current is fed to the AMR head of this structure, a magnetic field produced by this current is exerted on the soft magnetic bias film 3. As a result, the soft magnetic bias film 3 is magnetized and a magnetic field produced in consequence of this magnetization can rotate the magnetization of the AMR film 1. The ratio of change in magnetoresistance of the AMR head of this structure is on the order of 3% even when this AMR head exhibits highly satisfactory soft magnetic property. Thus, the AMR head has the possibility of failing to cope with a decline which is suffered to occur in the magnetic field of the signal from the magnetic recording medium in consequence of an increase in recording density.

The GMR head which uses such a GMR film 9 as a sandwich film composed of ferromagnetic layer 6/nonmagnetic intermediate layer 7/ferromagnetic layer 8 as shown in FIG. 8, therefore, has come to attract growing interest. The observation that the GMR head of a certain type produced a ratio of change exceeding 10% in magnetoresistance effect at normal room temperature is reported in literature |as in Journal of Japan Applied Magnetics Society, 17, 91 (1993), for example|.

The GMR head, unlike the AMR head, shows a low magnetoresistance effect when the magnetizations contained in the ferromagnetic layers 6, 8 are parallel to each other and a high magnetoresistance effect when the magnetizations are antiparallel to each other. The structure which is shown in FIG. 8 is such that the magnetization of the upper ferromagnetic layer 8 is fixed by an antiferromagnetic exchange bias film 10 and the magnetization of the lower ferromagnetic layer 6 moves freely. The GMR film 9 is enabled infallibly to draw in an input magnetic flux by having a magnetic undercoating film 11 disposed in contact with the ferromagnetic layer 6. Since the magnetic undercoating film 11 is ferromagnetically coupled with the ferromagnetic layer 6, the magnetization of the ferromagnetic layer 6 is rotated in accompany with the rotation of the magnetization of the magnetic undercoating film 11. Incidentally, ferromagnetic bias films 12, 12 are disposed underneath the opposite terminal parts of the magnetic undercoating film 11.

Since the AMR head and the GMR head alike effect the reading of recorded information by extracting a change in reluctance due to the magnetic field of a signal, they introduce a sense current as an input and emit a corresponding change in reluctance in the form of a change in voltage. Since the soft magnetic bias film 3 and the magnetic undercoating film 11 are disposed in indirect or direct contact with the AMR film 1 or the GMR film 9, the sense current is fed also to the soft magnetic films 3 and 11. Since the amounts of electric current which flow into the soft magnetic films 3 and 11, namely the amounts of shunt electric current, deserve no complete disregard, the changes in reluctance are smaller than when the amounts of shunt electric current are nil. If the reluctances of the soft magnetic films 3 and 11 are equal to those of the AMR film 1 and the GMR film 9, the rates of change in magnetic reluctance will be halved. In the light of all these factors, the reluctances of the soft magnetic films 3, 11 ought to be large.

More often than not, the soft magnetic films 3, 11 are formed underneath the AMR film 1 or the GMR film 9 as shown in FIG. 7 and FIG. 8. In the configuration of this kind, the soft magnetic films 3, 11 are destined to affect the orienting properties of the AMR film 1 and the GMR film 9. Generally, in such circumstance, it is made possible to improve the device characteristics by endowing the soft magnetic films 3 and 11 with a function of enhancing the fcc (111) orienting properties of the AMR film 1 and the GMR film 9.

Attempts, therefore, have been being made to enhance the fcc (111) orienting property of the GMR film 9 by using Permalloy films for the soft magnetic films 3, 11. The GMR film 9 has not yet acquired a fully satisfactory ratio of change in magnetic reluctance in spite of the efforts. This fact indicates that the fcc (111) orienting property due to the Permalloy films is still insufficient.

For the purpose of improving the characteristics of the soft magnetic films 3, 11, there may be conceived an idea of using NiFe, for example, as a main component and causing this main component to incorporating additive elements therein. In fact, a report purporting to demonstrate the effectiveness of the incorporation of Nb, Zr, etc. as additive elements for enhancing the resistivity is reported in literature |J. Appl. Phys., 69, 5631 (1991)|. The incorporation of such additive elements, however, brings about no notable improvement in the fcc (111) orienting property which constitutes another important property. If the amount of such additive elements to be incorporated is increased beyond a certain level, the orienting property will be degraded rather than improved and the saturation magnetization will be likewise lowered.

As described above, while ideas concerning the exaltation of resistivity of the soft magnetic films destined to serve as undercoats for the AMR film and the GMR film have been proposed heretofore, no thoroughgoing study has ever been made on the improvement of the orienting properties of the AMR film and the GMR film. A soft magnetic film which fulfills both the exaltation of the resistivity and the improvement of the fcc (111) orienting property has not yet been perfected.

SUMMARY OF THE INVENTION

The present invention, produced for the sake of overcoming the drawbacks encountered to date as described above, has an object of providing a magnetoresistive head having the magnetoresistive ratio and other characteristics improved by increasing the resistivity of a soft magnetic film deposited between a substrate and an MR film and, at the same time, exalting the fcc (111) preferred orientation.

The first magnetoresistive head according to this invention is a magnetoresistive head comprising a giant magnetoresistive film having at least a pair of ferromagnetic layers opposed to each other and a nonmagnetic intermediate layer disposed between the pair of ferromagnetic layers, and a crystalline soft magnetic film disposed as an undercoat in contact with at least the surface of one of the pair of ferromagnetic layers, wherein the crystalline soft magnetic film essentially consisting of at least one element selected from the group consisting of Ni, Fe and Co as a main component, at least one element selected from the group consisting of Nb, Mo, V, W, Ti, Zr, Hf and Ta, and at least one element selected from the group consisting of Cr, Rh, Os, Re, Si, Al, Be, Ga and Ge.

The second magnetoresistive head according to this invention is a magnetoresistive head comprising an anisotropic-magnetoresistive film, and a crystalline soft magnetic film disposed in contact directly with the anisotropic-magnetoresistive film or indirectly through the medium of a nonmagnetic film as an undercoat of the anisotropic-magnetoresistive film, wherein the crystalline soft magnetic film essentially consisting of at least one element selected from the group consisting of Ni, Fe and Co as a main component, at least one element selected from the group consisting of Nb, Mo, V, W, Ti, Zr, Hf and Ta, and at least one element selected from the group consisting of Cr, Rh, Os, Re, Si, Al, Be, Ga and Ge.

The magnetoresistive device according to this invention is a magnetoresistive device comprising a laminated film comprising first and second ferromagnetic layers and a nonmagnetic layer disposed between the first and second ferromagnetic layers, and a magnetic film of a NiFe alloy disposed on the laminated film in contact with one of the first and second ferromagnetic layers, wherein one of the first and second ferromagnetic layers comprises Co or a CoFe alloy, and the NiFe alloy comprises at least one element selected from the group consisting of Nb, Mo, V, W, Ti, Zr, Hf and Ta, and at least one element selected from the group consisting of Cr, Rh, Os, Re, Si, Al, Be, Ga and Ge.

The crystalline soft magnetic film to be used in the present invention uses as a main component thereof at least one element selected from the group consisting of Ni, Fe, and Co and also incorporates therein an M element capable of forming a grain boundary for the sake of increasing the resistivity and improving soft magnetic property. As the main component of crystalline soft magnetic film, a NiFe alloy is desirable. The NiFe alloy has a composition represented by the general formula $Ni_{100-b}Fe_b$, wherein b stands for an atomic % and is a number satisfying $0<b\leq 50$, more preferably, $10\leq b\leq 40$. As a concrete example of the M element, at least one element selected from the group consisting of Nb, Mo, V, W, Ti, Zr, Hf, and Ta may be cited. When the amount of the M element to be added is continuously increased, though the resistivity increases proportionately, the grain boundary becomes finer and the film ultimately has a nearly amorphous texture. From the viewpoint of keeping the preferred orientation, it is not proper to increase the amount of the M element to an unduly large amount. The characteristics aimed at, therefore, cannot be attained by only the addition of the M element.

Accordingly, in this invention, it is required to incorporate an additional M' element which, by forming a solid solution with the main component mentioned above in the crystal grains, contributes to exalting the fcc (111) preferred orientation and the increase in resistivity due to scatter of electrons near the Fermi surface unlike the formation of a grain boundary. As a result, the crystalline soft magnetic film is enabled to have the resistivity thereof exalted to a level exceeding 100 μΩcm, for example, and at the same time acquire an outstanding soft magnetic property with by high permeability and a highly desirable fcc (111) preferred orientation. As a concrete example of the M' element, at least one element selected from the group consisting of Cr, Rh, Os, Re, Si, Al, Be, Ga, and Ge may be cited. Enough of an increase of an resistivity of the crystalline soft magnetic film, however, cannot be attained by only the addition of the M' element.

When the M element and the M' element mentioned above are added each in an unduly large amount, the excesses thereof will go to degrade the fcc (111) preferred orientation and the soft magnetic property. Appropriately, therefore, the amount of the M element and that of the M' element to be added are not more than 20 at. %. If their amounts are each less than 0.1 at. %, the elements added at all will fail to manifest their effects. The crystalline soft magnetic film to be used in this invention, therefore, appropriately has a composition substantially represented by the general formula:

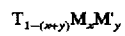

$$T_{1-(x+y)}M_xM'_y$$

wherein T stands for at least one element selected from the group consisting of Ni, Fe, and Co, M for at least one element selected from the group consisting of Nb, Mo, V, W, Ti, Zr, Rf, and Ta, and M' for at least one element selected from the group consisting of Cr, Rh, Os, Re, Si, Al, Be, Ga, and Ge, and x and y stand for numerals respectively satisfying the expressions, $0.001 \leq x \leq 0.200$ and $0.01 \leq y \leq 0.200$.

Appropriately, the thickness of the crystalline soft magnetic film is in the approximate range of 1 to 100 nm. If the thickness of the crystalline soft magnetic film is less than 1 nm, the crystallinity of the film will be degraded and the preferred orientation thereof will decrease. If this thickness conversely exceeds 100 nm, the possibility ensues that the amount of the shunt current suffered to flow into the crystalline soft magnetic film will increase and the change in reluctance of the magnetoresistive head will decrease even when the this film happens to have a high resistivity. For the purpose of this invention, the crystalline soft magnetic film is only required to possess a soft magnetic property such that the coercive force thereof is less than 800 A/m, preferably not more than about 80 A/m. The crystallinity of the film can be easily measured by means of X-ray diffraction.

Further, in the present invention, it is advantageous to heighten the crystallinity of the crystalline soft magnetic film by forming a nonmagnetic metal film essentially consisting of at least one element selected from the group consisting of Ti, Ta, Zr, Cr, Nb, and Hf between a substrate and this crystalline soft magnetic film. By having the nonmagnetic metal film disposed as an undercoat in contact with the crystalline soft magnetic film, the crystal growth with good crystallinity of crystalline soft magnetic film is achieved even when the thickness is so small as to fall in the neighborhood of 1 nm, and consequently an exalted fcc (111) preferred orientation. The thickness of the nonmagnetic metal film appropriately is in the approximate range of 1 to 100 nm. If the thickness of the nonmagnetic metal film is less than 1 nm, it will be difficult to improve the crystallinity of the crystalline soft metal film to a sufficiently high level. Conversely, if this thickness exceeds 100 nm, the possibility arises that the amount of the shunt current suffered to flow into the film will increase and the magnetoresistive change of the magnetoresistive head will unduly decrease.

The first magnetoresistive head of this invention has superposed on the crystalline soft magnetic film of the quality described above a giant magnetoresistive film (GMR film) having at least one pair of ferromagnetic films opposed to each other and a nonmagnetic intermediate layer disposed between the pair of ferromagnetic films in such a manner that at least one of the ferromagnetic layers may contact the crystalline soft magnetic film.

The ferromagnetic film materials which are effectively used for the ferromagnetic layers mentioned above include Co, CoFe, CoNi, NiFe, Sendust, NiFeCo, and Fe$_8$N, for example. These ferromagnetic films appropriately have a thickness in the range of 1 to 20 nm.

The ferromagnetic layer disposed on said crystalline soft magnetic film comprises a fcc (111) oriented ferromagnetic layer. The ferromagnetic layer comprising Co or a Co alloy is preferable. More preferably the ferromagnetic layer comprising a Co alloy is used. A desirable Co alloy is a CoFe alloy having a composition represented by the general formula $Co_{100-a}Fe_a$, wherein a stands for an atomic % and is a number satisfying $0 < a \leq 50$. More preferably, a is a number satisfying $5 \leq a \leq 40$.

The materials which are effectively used for the nonmagnetic film include such nonmagnetic metals as Mn, Cu, Al, Pd, Pt, Rh, Ru, Ir, Au, and Ag and such alloys as CuPd, CuPt, CuAu, and CuNi. Appropriately, the nonmagnetic film has a thickness in the range of 0.5 to 20 nm.

Owing to the adoption of the structure described above, the GMR film enjoys an exalted fcc (111) preferred orientation and, as a result, the GMR film is enabled to be improved in the soft magnetic property and the magnetoresistive ratio. Further, the fact that the resistivity of the crystalline soft magnetic film is high allows a marked decrease in the amount of the current which is suffered to flow into the crystalline soft magnetic film.

The magnetoresistive head which is constructed with the GMR film of the quality mentioned above, therefore, is enabled to be improved in the magnetoresistive ratio of the head and also in the MR sensitivity to be manifested. Wherein the MR sensitivity is represented by |The ratio of change in MR(%)| / |Magnetic field (Oe)|. The giant magnetoresistive films which are used effectively herein include such so-called spin valve films as Co/Cu/Co, CoFe/Cu/CoFe, and NiFe/Cu/NiFe and such artificial lattice films as (Fe/Cr)$_n$ laminate film and (Co/Cu)$_n$ laminate film, for example.

The second magnetoresistive head of this invention is formed by using the crystalline soft magnetic film of the quality mentioned above as a soft magnetic bias film, for example, and superposing thereon either directly or through the medium of a nonmagnetic film the ferromagnetic film (AMR film) manifesting anisotropic magnetoresistance. By adopting this structure, the fcc (111) preferred orientation of the AMR film can be exalted and the magnetoresistive ratio thereof can be increased. Further, since the soft magnetic bias film has high resistivity, the amount of the current suffered to flow into this film can be decreased to a great extent. The AMR film of such quality, like the GMR film, enables the magnetoresistive head formed therewith to be improved in the magnetoresistive ratio and in the MR sensitivity as well.

As the anisotropically magnetoresistive film, the film of such a Permalloy alloy as an Fe-Ni base alloy is used. Then, for the nonmagnetic metal film to be optionally interposed between the AMR film and the crystalline soft magnetic film, Ti, Ta, Zr, Pt, Au, Ag, Cu, TaN, SiO$_2$ and Pd can be used. In these materials, Ti, Ta, and Zr prove preferable with consideration to the higher resistivity of the nonmagnetic film and Pt, Au, Ag, Cu, and Pd prove preferable from the viewpoint of the preferred orientation. In the case of Pt, Au, Ag, Cu, and Pd, they may be alloyed with Ni, Fe, Co, Cr, Mn, etc. for the sake of enhancing the resistivity of the nonmagnetic film. Appropriately, this nonmagnetic film has a thickness of not more than 100 nm in order to suppress the amount of the shunt current suffered to flow into the film.

In the first and second magnetoresistive head, the magnetoresistive head of this invention may comprise an amorphous magnetic layer, as an undercoat of the magnetic film.

In the magnetoresistive device of this invention, the NiFe alloy may further comprise Co. In addition, the NiFe alloy has a composition represented by the general formula, $T_{1-(x+y)}M_xM'_y$, wherein T stands for Ni and Fe, M stands for at least one element selected form the group consisting of Nb, Mo, V, W, Ti, Zr, Hf and Ta, M' stands for at least one element selected from the group consisting of Cr, Rh, Os, Re, Si, Al, Be, Ga and Ge, and x and y stand for numerals respectively satisfying the expressions, $0.001 \leq x \leq 0.200$ and $0.01 \leq y \leq 0.200$.

In the above composition, preferable, T has a composition represented by the general formula, $Ni_{100-b}Fe_b$, wherein b stands for an atomic % and is a number satisfying $0 < b \leq 50$.

One of the first and second ferromagnetic layers of the magnetoresistive device comprises a fcc (111) oriented film of Co or a Co alloy. This Co alloy may have a composition represented by the formula of $Co_{100-a}Fe_a$, wherein a stands for an atomic % and is a number satisfying $5 \leq a \leq 40$.

Further, the magnetoresistive device of this invention may dispose a nonmagnetic metal film of at least one element selected from the group consisting of Ti, Ta, Zr, Cr, Nb and Hf, as an undercoat of the magnetic film.

The magnetoresistive device of this invention may dispose an amorphous magnetic layer, as an undercoat of the magnetic film.

The magnetoresistive device of this invention may use as, for example, a sensor, a memory and the likes.

DESCRIPTION OF THE PREFERRED EMBODIMENT

Now, the embodiments of this invention will be described below.

EXAMPLE 1

First, on an Si substrate provided in advance thereon with a thermally oxidized film 100 nm in thickness, a crystalline soft magnetic film of a composition of $Ni_{73.7}Fe_{19.0}Nb_{3.8}Cr_{3.5}$ resulting from the addition of Nb and Cr to a NiFe Permalloy was superposed in a thickness of 10 nm. Then, on this crystalline soft film used as a soft magnetic undercoating film, a laminate film of CoFePd(4 nm)/Cu(2.5 nm)/CoFePd(4 nm) was superposed as a spin valve film. Further on the spin valve film, an FeMn alloy film was superposed in a thickness of 15 nm as an antiferromagnetic exchange bias film. A pair of CoPt films of a thickness of 20 nm was formed in advance as a ferromagnetic bias film underneath the opposite terminal parts of the soft magnetic undercoating film. Then, a GMR head was completed by superposing a pair of terminals made of Ta/Cu/Ta and adapted to feed a sense current on the antiferromagnetic exchange bias film. This GMR head had a specific structure identical to that of a conventional GMR head shown in FIG. 8.

COMPARATIVE EXAMPLE 1

As the conventional GMR head, a GMR head (Comparative Example 1) was manufactured by using a NiFe alloy film as a crystalline soft magnetic film and superposing a laminate film of NiFe(10 nm)/CoFePd(4 nm)/Cu(2.5 nm)/CoFePd(4 nm)/FeMn(15 nm) on the same thermally oxidized Si substrate as used in Example 1.

Figure 1:
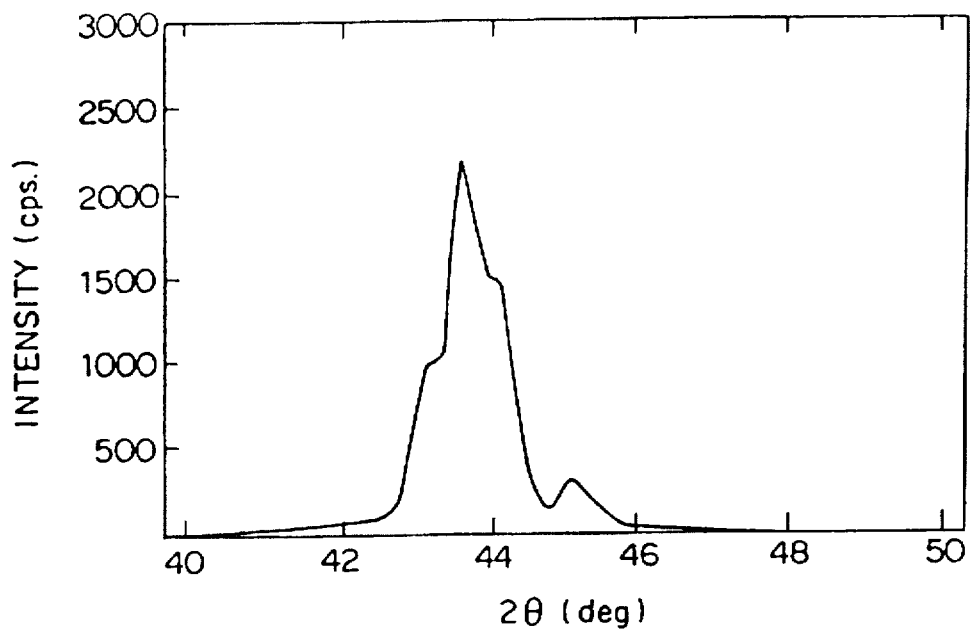
FIG. 1 is a diagram showing the X-ray diffraction profile of a GMR film in a GMR head according to one embodiment of this invention.

The GMR heads of Example 1 and Comparative Example 1 obtained as described above were tested for fcc (111) orientation property. FIG. 1 is the profile of the neighborhood of (111) peak obtained by the X-ray diffraction of the GMR film in the GMR head of Example 1 and FIG. 2 is the profile of the neighborhood of (111) peak similarly obtained of the GMR film in the GMR head of Comparative Example 1.

Figure 2:
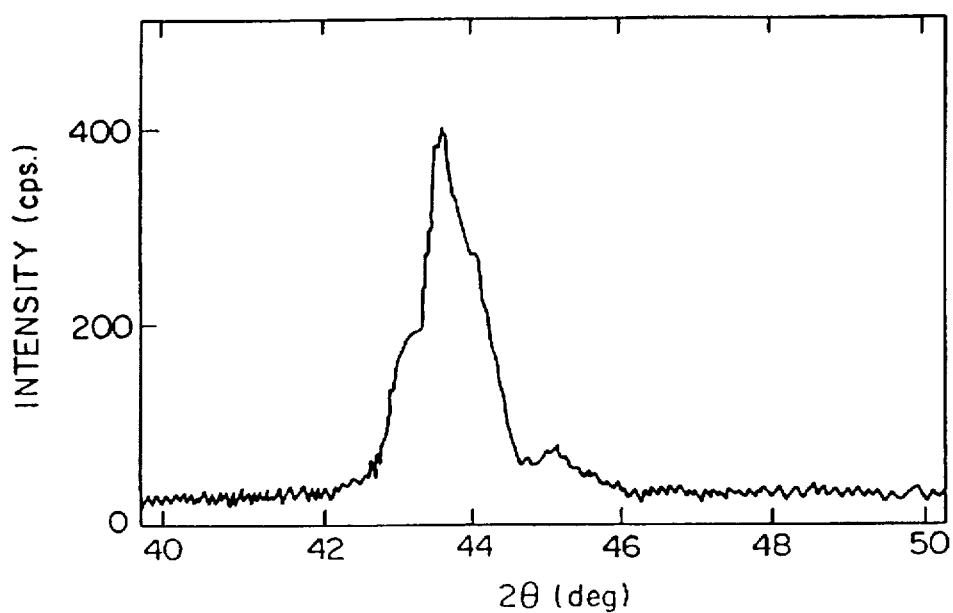
FIG. 2 is a diagram showing the X-ray profile of a conventional GMR head.

It is clearly noted from FIG. 1 and FIG. 2 that the GMR head of Example 1 obtained a (111) peak strength more than 10 times that obtained by the conventional GMR head. Since the peaks forming shoulders are based on the interference in the laminate layers and no other fcc peak like a (200) peak was found around a wide range of 2θ from 40° to 90°, the (111) peak intensity was used for evaluating the fcc (111) orientation property.

In the GMR heads of Example 1 and Comparative Example 1 mentioned above, the NiFeNbCr film used as the soft magnetic undercoating film in the GMR head of Example 1 had a resistivity of 110 μΩcm and the NiFe Permalloy used in Comparative Example 1 had a resistivity of 30 μΩcm. The comparison clearly indicates that the addition of the two elements, M element and M' element, resulted in enhancing the magnitude of resistivity while improving the fcc (111) preferred orientation.

As to the magnetoresistive ratio which constitutes one of the important characteristics, the GMR head of Example 1 showed a highly satisfactory magnitude exceeding 10% (10.3%) while the GMR head of Comparative Example 1 showed a magnitude of 2.5%. The former GMR head showed an improved MR sensitivity of 2.0% as compared with the sensitivity of 1.0% shown by the latter GMR head. It is safely concluded that these better results originated in the improvements achieved by the GMR film and the soft magnetic film superposed thereon with large resistivity and the fcc (111) preferred orientation and that the improvement in the fcc (111) preferred orientation particularly contributed to enhancing these properties.

The use of the crystalline soft magnetic film which resulted from the incorporation of two elements different in quality into the main component such as an NiFe alloy allowed the GMR head to acquire improved characteristics as described above. This fact demonstrates the usefulness of this invention. The results described above are shown in Table 1 and Table 2.

Figure 3:
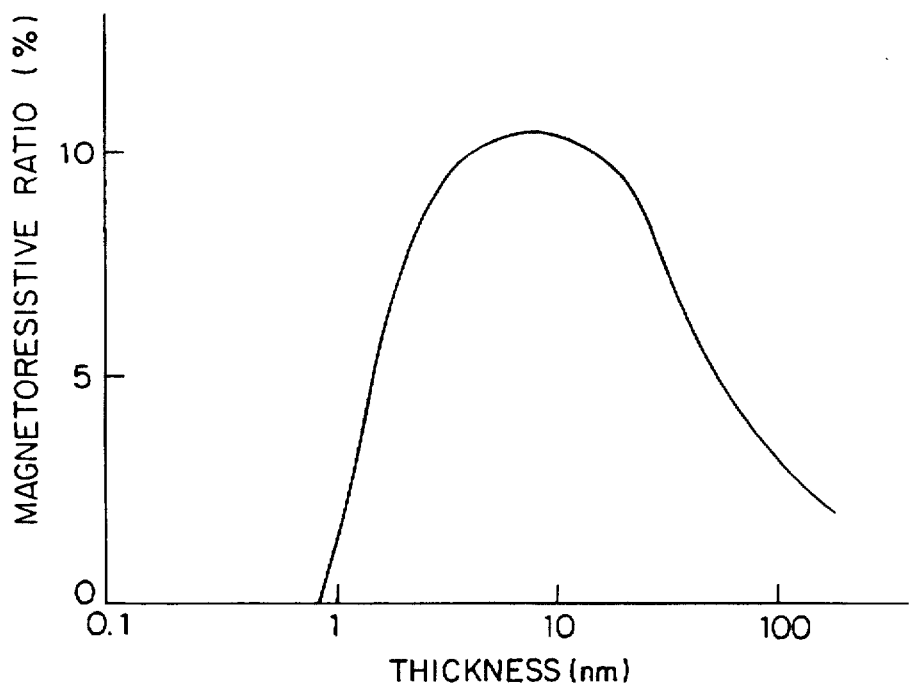
FIG. 3 is a characteristic diagram showing the relation between the film thickness and the magnetoresistivity of a crystalline soft magnetic film in the GMR head according to one embodiment of this invention.

The relation between the thickness and the ratio of change in magnetoresistance obtained of the crystalline soft magnetic film made of the NiFeNbCr film mentioned above is shown in FIG. 3. It is noted from FIG. 3 that the thickness of the crystalline soft magnetic film appropriately falls in the range of 1 to 100 nm. If the thickness of the crystalline soft magnetic film is less than 1 nm, the film will not acquire a fully satisfactory magnetoresistive ratio because the film is still in the stage of initial growth and, therefore, undergoes crystallization with difficulty and acquires an inferior orientation property. Conversely, if the thickness of the crystalline soft magnetic film exceeds 100 nm, the film will tend to suffer a decrease in the ratio of change in magnetoresistance because the amount of the shunt current cannot be sufficiently decreased.

As to the proportions of the components of NiFe as the main component of the present example, it is appropriate for the proportion of Ni to be in the range of from 60 at. % to 90 at. % and that of Fe in the range of from 40 at. % to 10 at. % in due respect of the balance between the soft magnetic property and the magnitude of the magnetic moment.

A ternary alloy of NiFeCo may be used as the main component. If the proportion of Co to be incorporated exceeds 50 at. %, however, the excess of Co will go to increase excessively the coercive force, Hc, and consequently impair the soft magnetic property.

Incidentally, the present example used the Si substrate which was provided with a thermally oxidized film. When a GMR head was manufactured by following the procedure of this example while using an alumina film formed on an altic substrate instead, it was confirmed to produce the same effect.

EXAMPLE 2

As compared with Example 1 representing a case of growing a crystalline soft magnetic film directly on a Si substrate provided in advance thereon with a thermally oxidized film or an alumina film, for this Example 2, a $Co_{87}Zr_{5.5}Nb_{7.5}$ film was formed in a thickness of 10 nm as an amorphous magnetic undercoating film for a crystalline soft magnetic film and a crystalline soft magnetic film of a composition of $Ni_{73.7}Fe_{19.0}Nb_{3.8}Cr_{3.5}$ was superposed in a thickness of 5 nm on the undercoating film for the sake of further enhancing the fcc (111) preferred orientation. Then, a spin valve film and an antiferromagnetic exchange bias film were superposed thereon in the same manner as in Example 1.

The GMR film in the GMR head manufactured as described above was tested for the fcc (111) orientation property. As a result, it was confirmed that the intensity of the fcc (111) peak was nearly equal to that obtained in Example 1. This fact indicates that, notwithstanding the thickness of the crystalline soft magnetic film was one half of that of Example 1, the GMR film showed this high fcc (111) preferred orientation.

In this Example 2, in spite of the inevitable flow of the shunt current into the magnetic undercoating film, the fcc (111) orientation was so high that the ratio of change in GMR was 11% and the GMR sensitivity was 2.2%/Oe, i.e. magnitudes higher than those obtained in Example 1. The magnetic undercoating film used in this example cooperated with the crystalline soft magnetic film to permit impartation of high soft magnetism.

Figure 4:
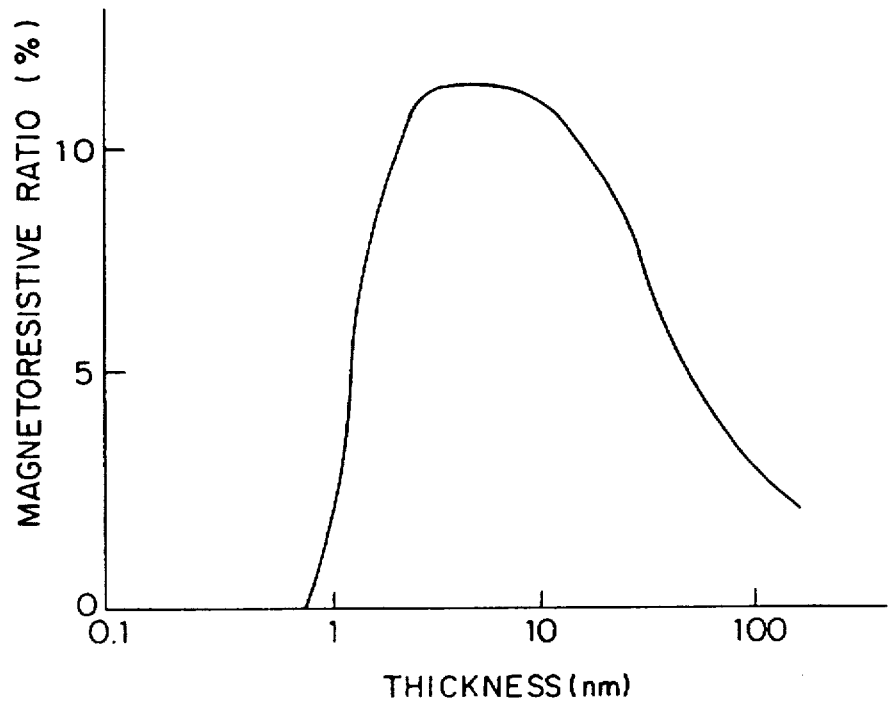
FIG. 4 is a characteristic diagram showing the relation between the film thickness and the magnetoresistivity of a crystalline soft magnetic film in the GMR head according to another embodiment of this invention.

The relation between the thickness and the ratio of change in magnetoresistance (ratio of change in GMR) obtained of the crystalline soft magnetic film provided with a $Co_{87}Zr_{5.5}Nb_{7.5}$ magnetic under-coating film is shown in FIG. 4. This diagram, unlike that of FIG. 3, clearly shows that a high magnetoresistive ratio was obtained when the film thickness was in the neighborhood of 5 nm and that the magnetic undercoating film aided in the growth of the crystalline soft magnetic film.

For the magnetic undercoating film which exalted the fcc (111) preferred orientation of this crystalline soft magnetic film, amorphous CoZrNb based or a microcrystalline FeN based alloy like FeZrN manifested the same effect.

EXAMPLE 3

Example 2 cited above represents a case of using a single-layer magnetic coating film as the magnetic undercoating film for enhancing the fcc (111) preferred orientation of the crystalline soft magnetic film. A multilayer film consisting of a nonmagnetic undercoating film and a magnetic undercoating film may be used in the place of the single-layer magnetic under-coating film mentioned above.

In this Example 3, a crystalline soft magnetic film of a composition of $Ni_{73.7}Fe_{19.0}Nb_{3.8}Cr_{3.5}$ was formed in a thickness of 5 nm on an undercoat obtained by forming a $Co_{87}Zr_{5.5}Nb_{7.5}$ film in a thickness of 5 nm on a nonmagnetic film of Ta of a thickness of 5 nm. Then, a spin valve film and an antiferromagnetic exchange bias film were formed thereon in the same manner as in Example 1.

The GMR film in the GMR head manufactured as described above was tested for the fcc (111) preferred orientation. As a result, it was confirmed that the intensity of the fcc (111) peak was nearly equal to that obtained in Example 1. The use of the two-layer undercoating film as mentioned above allowed the fcc (111) orientation property to remain at a high level and produced consequently a ratio of change in GMR of 11% and a sensitivity of GMR of 2.2%/Oe, i.e. magnitudes nearly equal to those obtained in Example 2. Further in the present example, the total magnetic moment was smaller than that of Example 2. The head ultimately produced, therefore, showed an increase in the magnetic flux from the medium and could be expected to enjoy an increased output.

For the nonmagnetic undercoating film in this example, Ti, Zr, Cr, Nb, and Hf were confirmed to produce the same effect as Ta. Appropriately, the nonmagnetic undercoating film has a thickness in the range of 1 nm to 10 nm. If the thickness is less than 1 nm, the film will not be easily formed as a single-layer film. If this thickness exceeds 10 nm, the amount of the shunt current suffered to flow in will increase. If the thickness of the magnetic undercoating film is not more than 1 nm, the film will not be easily formed as a single-layer film. If the thickness exceeds 10 nm, the amount of the shunt current will unduly increase. If the thickness is larger, then the nonmagnetic undercoating film will be no longer necessary.

Figure 8:
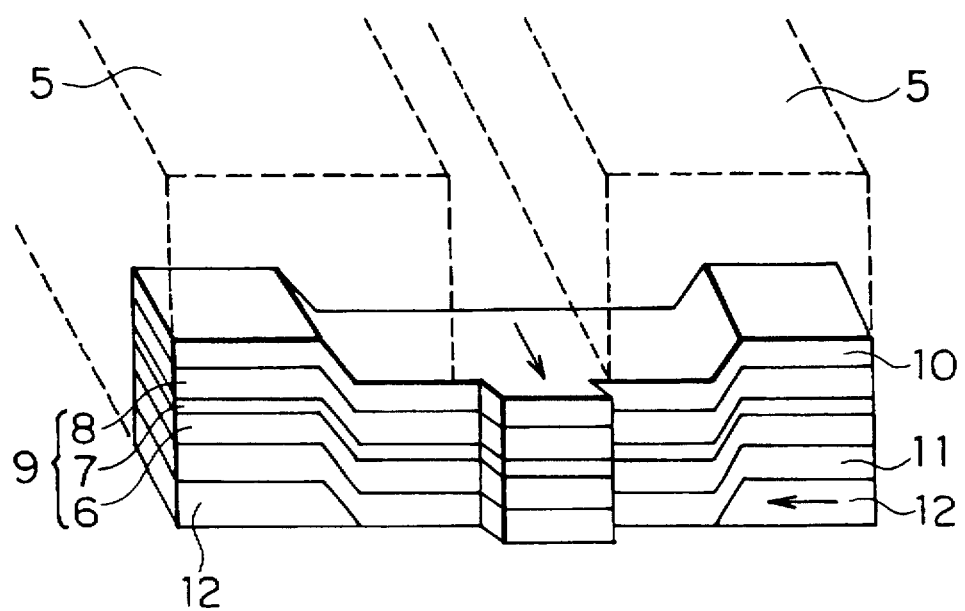
FIG. 8 is a perspective view showing the structure of the essential part of a GMR head.
Figure 9:
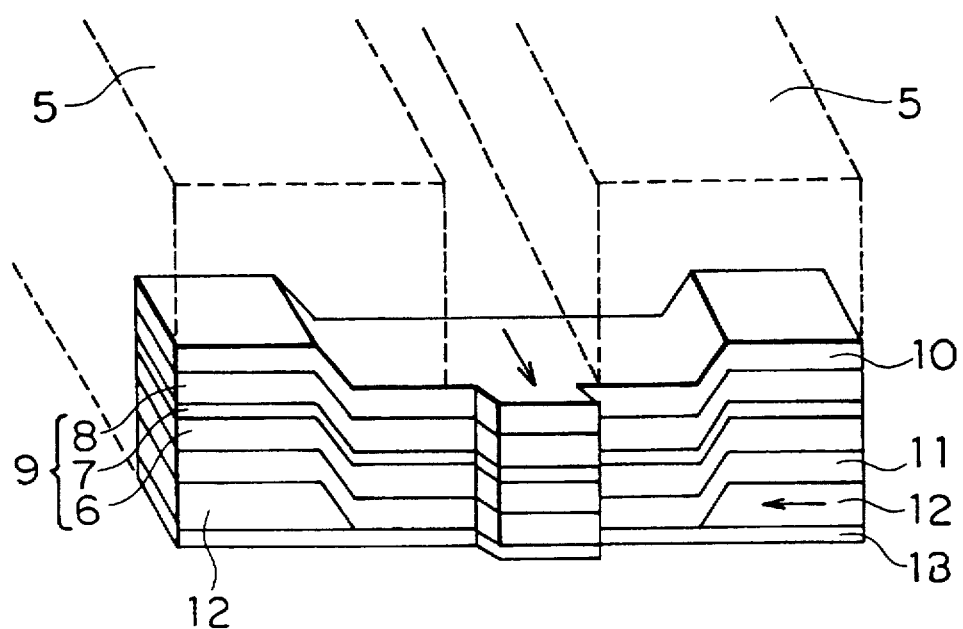
FIG. 9 is a perspective view showing the structure of the essential part of another GMR head.

The head of this example may use the structure shown in FIG. 8. This structure, however, has the possibility of cut off of the exchange coupling between a ferromagnetic bias film 12 and a soft magnetic film 11 by the nonmagnetic undercoating film. It is, therefore, preferable for the nonmagnetic undercoating film 13 to be disposed underneath the ferromagnetic bias film 12 as shown in FIG. 9.

The additive elements for the crystalline soft magnetic film which were indicated in the preceding Examples 2 and 3 were found to produce the same effects with respect to the elements which will be indicated in the following Examples 4 through 34.

EXAMPLES 4 TO 34 AND COMPARATIVE EXAMPLES 2 TO 13

GMR heads were manufactured by following the procedure of Example 1 while using crystalline soft magnetic films of varying compositions shown in Table 1 and Table 2 in the place of the crystalline soft magnetic film of Example 1. For comparison with this invention, GMR heads (Comparative Examples 2 through 9) using crystalline soft magnetic films resulting from the sole incorporation of an M element in the main component of a NiFe alloy and GMR heads (Comparative Examples 10 through 13) using crystalline soft magnetic films resulting from the sole incorporation of an M' element in the main component of a NiFe alloy were manufactured in the same manner as in Example 1.

The crystalline soft magnetic films in the GMR heads of the examples and the comparative examples mentioned above were tested for the (111) peak intensity and the magnitude of resistivity and, at the same time, the GMR heads were tested for the ratio of change in GMR and the GMR sensitivity. The results are shown in Table 1 and Table 2.

In the Table 1 and Table 2, NiFe as a main component of the crystalline soft magnetic film consists of 80 at. % of Ni and 20 at. % of Fe. In the following examples, the same NiFe was used.

TABLE 1

| | COMPOSITION | | | (111) PEAK INTEN-SITY | $\rho$ ($\mu\Omega$cm) | GMR RATIO OF CHANGE (%) | GMR SENSI-TIVITY (%/Oe) |
|---|---|---|---|---|---|---|---|
| | MAIN COMPO-NENT | M (at %) | M' (at %) | | | | |
| EXAMPLE | | | | | | | |
| 1 | NiFe | Nb(3.8) | Cr(3.5) | 2500 | 110 | 10.3 | 2.0 |
| 4 | NiFe | Mo(4.8) | Cr(3.5) | 2600 | 105 | 10.5 | 1.8 |
| 5 | NiFe | V(2.6) | Cr(3.5) | 2400 | 100 | 11.0 | 2.2 |
| 6 | NiFe | W(1.7) | Cr(3.5) | 2500 | 120 | 9.8 | 1.6 |
| 7 | NiFe | Ti(2.7) | Cr(3.5) | 3000 | 115 | 10.2 | 1.7 |
| 8 | NiFe | Zr(1.9) | Cr(3.5) | 3400 | 100 | 10.6 | 2.3 |
| 9 | NiFe | Hf(2.4) | Cr(3.5) | 2600 | 110 | 10.9 | 1.8 |
| 10 | NiFe | Ta(3.2) | Cr(3.5) | 2100 | 103 | 11.1 | 1.5 |
| 11 | NiFe | Nb(3.4) | Rh(5.0) | 2400 | 107 | 10.1 | 2.6 |
| 12 | NiFe | Mo(4.6) | Rh(5.0) | 3400 | 112 | 9.5 | 1.1 |
| 13 | NiFe | V(2.4) | Rh(5.0) | 2800 | 106 | 9.8 | 1.2 |
| 14 | NiFe | W(1.8) | Rh(5.0) | 3200 | 104 | 10.2 | 1.6 |
| 15 | NiFe | Ti(2.6) | Rh(5.0) | 2600 | 103 | 11.3 | 1.7 |
| 16 | NiFe | Zr(1.7) | Rh(5.0) | 2900 | 110 | 10.4 | 1.3 |
| 17 | NiFe | Hf(2.2) | Rh(5.0) | 3100 | 100 | 10.6 | 2.0 |
| 18 | NiFe | Ta(3.4) | Rh(5.0) | 2600 | 106 | 10.2 | 2.0 |
| 19 | NiFe | Nb(3.2) | Os(4.1) | 2700 | 104 | 10.1 | 2.4 |
| 20 | NiFe | Mo(4.4) | Os(4.1) | 2800 | 108 | 10.9 | 2.3 |
| 21 | NiFe | V(2.2) | Os(4.1) | 2400 | 102 | 10.7 | 2.0 |
| 22 | NiFe | W(1.6) | Os(4.1) | 2600 | 106 | 9.6 | 1.8 |
| 23 | NiFe | Ti(2.1) | Os(4.1) | 2500 | 113 | 10.4 | 1.4 |
| 24 | NiFe | Zr(1.5) | Os(4.1) | 2400 | 104 | 10.2 | 1.7 |
| 25 | NiFe | Hf(2.6) | Os(4.1) | 2300 | 102 | 10.6 | 1.6 |
| 26 | NiFe | Ta(2.8) | Os(4.1) | 3500 | 106 | 11.8 | 2.1 |

TABLE 2

| | COMPOSITION | | | (111) PEAK INTEN-SITY | $\rho$ ($\mu\Omega$cm) | GMR RATIO OF CHANGE (%) | GMR SENSI-TIVITY (%/Oe) |
|---|---|---|---|---|---|---|---|
| | MAIN COMPO-NENT | M (at %) | M' (at %) | | | | |
| EXAMPLE | | | | | | | |
| 27 | NiFe | Nb(3.0) | Si(6.2) | 4000 | 112 | 11.7 | 2.6 |
| 28 | NiFe | Mo(4.1) | Si(6.2) | 3800 | 115 | 11.5 | 2.4 |
| 29 | NiFe | V(2.0) | Si(6.2) | 2600 | 118 | 10.4 | 2.2 |
| 30 | NiFe | W(1.9) | Si(6.2) | 2400 | 104 | 10.5 | 1.6 |
| 31 | NiFe | Ti(3.0) | Si(6.2) | 2800 | 103 | 10.4 | 2.7 |
| 32 | NiFe | Zr(2.0) | Si(6.2) | 3100 | 107 | 10.9 | 1.9 |
| 33 | NiFe | Hf(2.5) | Si(6.2) | 2600 | 102 | 10.7 | 2.4 |
| 34 | NiFe | Ta(3.6) | Si(6.2) | 2400 | 100 | 10.5 | 2.1 |
| COMPARATIVE EXAMPLE | | | | | | | |
| 1 | NiFe | — | — | 400 | 30 | 2.5 | 0.6 |
| 2 | NiFe | Nb(3.8) | — | 650 | 82 | 5.2 | 0.7 |
| 3 | NiFe | Mo(4.8) | — | 500 | 75 | 4.2 | 0.5 |
| 4 | NiFe | V(2.4) | — | 620 | 83 | 5.0 | 0.8 |
| 5 | NiFe | W(1.8) | — | 580 | 78 | 4.8 | 0.6 |
| 6 | NiFe | Ti(2.1) | — | 610 | 75 | 5.0 | 0.6 |
| 7 | NiFe | Zr(1.5) | — | 640 | 85 | 5.2 | 0.7 |
| 8 | NiFe | Hf(2.5) | — | 600 | 78 | 4.9 | 0.5 |
| 9 | NiFe | Ta(3.6) | — | 550 | 80 | 4.5 | 0.5 |
| 10 | NiFe | — | Cr(3.5) | 2000 | 58 | 7.2 | 1.2 |

TABLE 2-continued

| | COMPOSITION | | | (111) PEAK INTENSITY | ρ (μΩcm) | GMR RATIO OF CHANGE (%) | GMR SENSITIVITY (%/Oe) |
|---|---|---|---|---|---|---|---|
| | MAIN COMPONENT | M (at %) | M' (at %) | | | | |
| 11 | NiFe | — | Rh(5.0) | 1800 | 56 | 7.0 | 1.1 |
| 12 | NiFe | — | Os(4.1) | 2100 | 61 | 6.8 | 0.9 |
| 13 | NiFe | — | Si(6.2) | 1600 | 55 | 7.1 | 1.0 |

It is clearly noted from Table 1 and Table 2 that the GMR of the working examples of this invention invariably led in the fcc (111) preferred orientation and exhibited high levels of magnetoresistance and, as a result, acquired perfect characteristics. In contrast, it is noted that the crystalline soft magnetic films incorporating an M element alone failed to acquire any improvement in the fcc (111) orientation property, though it attained an increase in magnetoresistance more or less but not fully satisfactorily. It is further noted that the crystalline soft magnetic films incorporating an M' element alone likewise failed to obtain a satisfactory increase in resistivity, though it was improved in the fcc (111) orientation property. As a result, the GMR heads of the comparative examples failed to acquire fully satisfactory characteristics.

EXAMPLE 35 AND COMPARATIVE EXAMPLE 14

Figure 7:
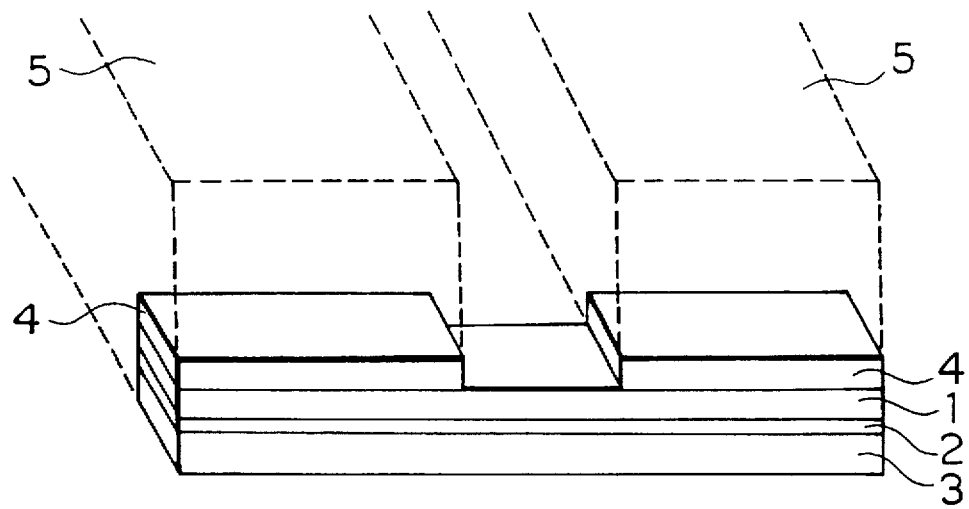
FIG. 7 is a perspective view showing the structure of the essential part of an AMR head.

On an Si substrate provided in advance thereon with a thermally oxidized film, a crystalline soft magnetic film of a composition of $Ni_{75.1}Fe_{18.2}Zr_{1.7}Rh_{5.0}$ obtained by the addition of Zr and Rh to a NiFe Permalloy was formed in a thickness of 30 nm. On this crystalline soft magnetic film as a soft magnetic bias film, a Ti film was superposed in a thickness of 40 nm as a nonmagnetic film and a NiFe alloy film in a thickness of 40 nm as an AMR film. Then, an AMR head was completed by superposing on the AMR film a pair of terminals made of Cu and adapted to feed a sense current. This AMR head had a specific structure identical to that of a conventional AMR head shown in FIG. 7.

The AMR head according to the present working example showed a highly satisfactory ratio of change in magnetoresistance exceeding 3% (3.4%). When the conventional CoZr base film was used as a soft magnetic bias film (Comparative Example 14), the ratio of change in magnetoresistance shown by this film was about 1%. Since the resistivity of the CoZr base alloy is 100 μΩcm and is substantially equal to that of the NiFeZnRh soft magnetic film, it is safe to conclude that the difference in the ratio of change in magnetoresistance largely reflected the improvement of the AMR film in the fcc (111) orientation property. This fact demonstrates the usefulness of this invention. The results are shown in Table 3 and Table 4.

Examples 36 to 67 and Comparative Examples 15 to 26:

AMR heads were manufactured by following the procedure of Example 35 while using crystalline soft magnetic films of varying compositions shown in Table 3 and Table 4 in the place of the crystalline soft magnetic film of Example 35. For comparison with this invention, AMR heads (Comparative Examples 15 to 22) using crystalline soft magnetic films resulting from the sole incorporation of an M element in the main component of a NiFe alloy and AMR heads (Comparative Examples 23 to 26) using crystalline soft magnetic films resulting from the sole incorporation of an M' element in the main component of a NiFe alloy were manufactured in the same manner as in Example 35.

The AMR heads of the working examples of this invention and the comparative examples were tested for ratio of change in magnetoresistance. The results are shown in Table 3 and Table 4.

TABLE 3

| | COMPOSITION | | | RATIO OF CHANGE IN MR (%) |
|---|---|---|---|---|
| | MEIN COMPONENT | M(at %) | M'(at %) | |
| EXAMPLE | | | | |
| 35 | NiFe | Zr(1.7) | Rh(5.0) | 3.4 |
| 36 | NiFe | Nb(3.8) | Cr(3.5) | 3.1 |
| 37 | NiFe | Mo(4.8) | Cr(3.5) | 3.2 |
| 38 | NiFe | V(2.6) | Cr(3.5) | 3.0 |
| 39 | NiFe | W(1.7) | Cr(3.5) | 2.8 |
| 40 | NiFe | Ti(2.7) | Cr(3.5) | 2.9 |
| 41 | NiFe | Zr(1.9) | Cr(3.5) | 3.4 |
| 42 | NiFe | Hf(2.4) | Cr(3.5) | 3.2 |
| 43 | NiFe | Ta(3.2) | Cr(3.5) | 3.1 |
| 44 | NiFe | Nb(3.4) | Rh(5.0) | 2.6 |
| 45 | NiFe | Mo(4.6) | Rh(5.0) | 2.5 |
| 46 | NiFe | V(2.4) | Rh(5.0) | 2.8 |
| 47 | NiFe | W(1.8) | Rh(5.0) | 2.9 |
| 48 | NiFe | Ti(2.6) | Rh(5.0) | 3.0 |
| 49 | NiFe | Zr(1.7) | Rh(5.0) | 3.4 |
| 50 | NiFe | Hf(2.2) | Rh(5.0) | 2.7 |
| 51 | NiFe | Ta(3.4) | Rh(5.0) | 3.5 |
| 52 | NiFe | Nb(3.2) | Os(4.1) | 3.4 |
| 53 | NiFe | Mo(4.4) | Os(4.1) | 2.6 |
| 54 | NiFe | V(2.2) | Os(4.1) | 2.8 |
| 55 | NiFe | W(1.6) | Os(4.1) | 2.4 |
| 56 | NiFe | Ti(2.1) | Os(4.1) | 2.3 |
| 57 | NiFe | Zr(1.5) | Os(4.1) | 2.9 |
| 58 | NiFe | Hf(2.6) | Os(4.1) | 3.5 |

TABLE 4

| | COMPOSITION | | | RATIO OF CHANGE IN MR (%) |
|---|---|---|---|---|
| | MAIN COMPONENT | M(at %) | M'(at %) | |
| EXAMPLE | | | | |
| 59 | NiFe | Ta(2.8) | Os(4.1) | 3.3 |
| 60 | NiFe | Nb(3.0) | Si(6.2) | 3.1 |
| 61 | NiFe | Mo(4.1) | Si(6.2) | 3.2 |
| 62 | NiFe | V(2.0) | Si(6.2) | 3.0 |
| 63 | NiFe | W(1.9) | Si(6.2) | 3.2 |
| 64 | NiFe | Ti(3.0) | Si(6.2) | 3.1 |
| 65 | NiFe | Zr(2.0) | Si(6.2) | 3.4 |
| 66 | NiFe | Hf(2.5) | Si(6.2) | 3.0 |
| 67 | NiFe | Ta(3.6) | Si(6.2) | 2.7 |

TABLE 4-continued

| COMPOSITION | | | RATIO OF |
|---|---|---|---|
| MAIN COMPO-NENT | M(at %) | M'(at %) | CHANGE IN MR (%) |
| COMPARATIVE EXAMPLE | | | |
| 14 | (CoZr) | | 1.0 |
| 15 NiFe | Nb(3.8) | — | 1.5 |
| 16 NiFe | Mo(4.8) | — | 1.2 |
| 17 NiFe | V(2.4) | — | 1.4 |
| 18 NiFe | W(1.8) | — | 1.3 |
| 19 NiFe | Ti(2.1) | — | 1.0 |
| 20 NiFe | Zr(1.5) | — | 1.1 |
| 21 NiFe | Hf(2.5) | — | 0.9 |
| 22 NiFe | Ta(3.6) | — | 0.8 |
| 23 NiFe | — | Cr(3.5) | 1.8 |
| 24 NiFe | — | Rh(5.0) | 1.7 |
| 25 NiFe | — | Os(4.1) | 1.9 |
| 26 NiFe | — | Si(6.2) | 1.6 |

The ratios of change in magnetoresistance obtained in the examples were noted to be large as compared with those obtained in the comparative examples. It is concluded that the increases in the ratio of change in MR resulted from the exaltations of the fcc (111) preferred orientation of the AMR film due to the use of the crystalline soft magnetic films similarly to the results obtained in Example 35.

Example 68:

On an Si substrate provided in advance thereon with a thermally oxidized film, a crystalline soft magnetic film of a composition of $Ni_{73.7}Fe_{19.0}Nb_{3.8}Cr_{3.5}$ was formed in a thickness of 10 nm through the medium of a nonmagnetic metal film of Ti formed in a thickness of 5 nm as an undercoat. Then, a spin valve film and an antiferromagnetic exchange bias film were superposed thereon in the same manner as in Example 1.

The GMR film of Example 68 thus obtained was tested for fcc (111) orientation property. As a result, it was confirmed that the peak showing the fcc (111) intensity was 12000, a value about five times that of a GMR head which omitted the interposition of a nonmagnetic undercoating film. This improvement is logically explained by a supposition that the nonmagnetic metal film made of Ti aided in the growth of the crystalline soft magnetic film and, as a result, allowed this film to be crystallized in spite of such a small thickness as 10 nm and brought out an increase in the orientation property of the GMR film. Thus, the ratio of change in GMR was 12.4% and the sensitivity of GMR was 2.4%/Oe, i.e. magnitudes higher than those obtained in Example 1.

Figure 5:
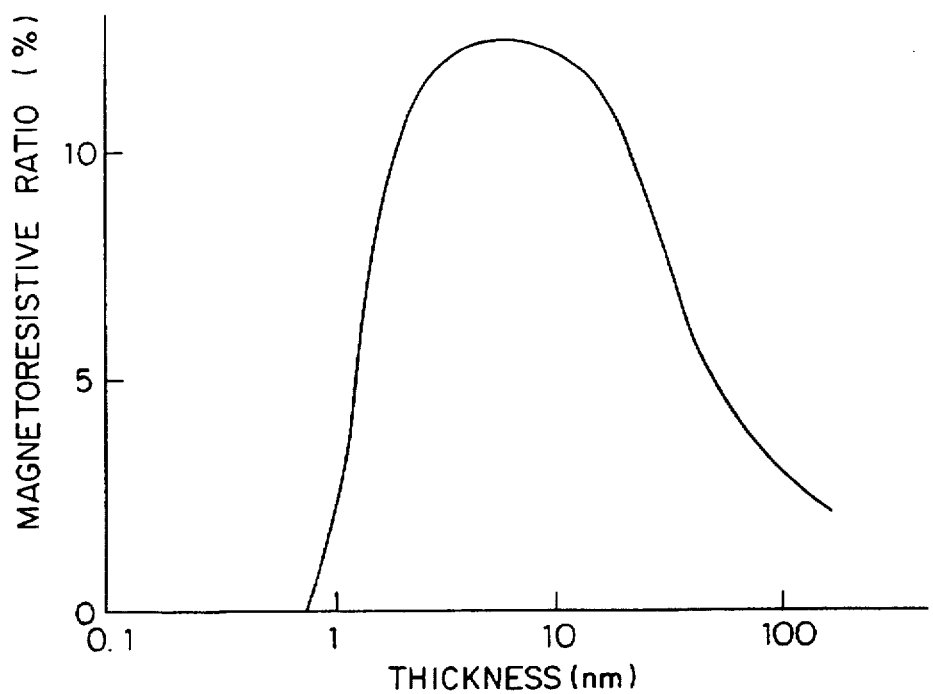
FIG. 5 is a characteristic diagram showing the relation between the film thickness and the magnetoresistivity of a crystalline soft magnetic film in the GMR head according to yet another embodiment of this invention.
Figure 6:
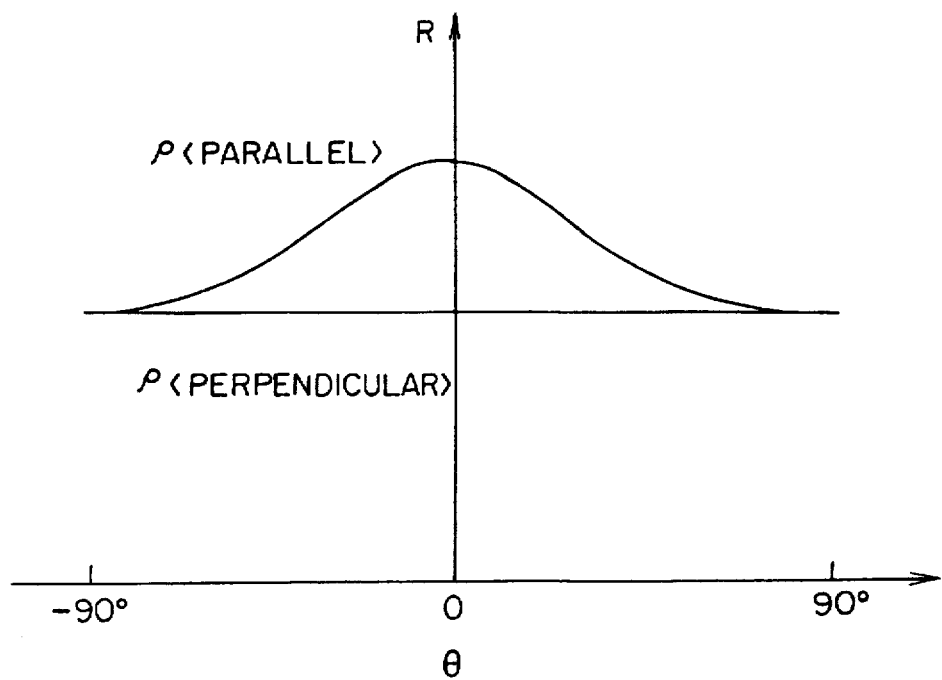
FIG. 6 is a diagram showing the AMR effect.

The relation between the thickness and the ratio of change in magnetoresistance (ratio of change in GMR) obtained of the crystalline soft magnetic film provided with a nonmagnetic undercoating film of Ti is shown in FIG. 5. This diagram, as compared with that of FIG. 3, clearly shows that a high ratio of change in GMR was obtained particularly when the film thickness was small.

The head of this working example may use a structure shown in FIG. 8 instead. This structure, however, has the possibility of cut off of the exchange coupling between the ferromagnetic bias film 12 and the magnetic undercoating film 11 by the nonmagnetic undercoating film. Preferably, therefore, the nonmagnetic undercoating film 13 is disposed underneath the ferromagnetic bias film 12 as shown in FIG. 9.

EXAMPLES 69 TO 99

GMR heads were manufactured by following the procedure of Example 68 while using crystalline soft magnetic films of varying compositions shown in Table 5 and Table 6 in the place of the crystalline soft magnetic film of Example 68. The crystalline soft magnetic films in the GMR heads of these working examples were tested for (111) peak intensity and, at the same time, the GMR heads were tested for ratio of change in GMR and GMR sensitivity. The results are additionally shown in Table 5 and Table 6.

TABLE 5

| | COMPOSITION | | | (111) | GMR RATIO | GMR |
|---|---|---|---|---|---|---|
| | MAIN COMPO-NENT | M (at %) | M' (at %) | PEAK INTEN-SITY | OF CHANGE (%) | SENSI-TIVITY (%/Oe) |
| EXAMPLE | | | | | | |
| 68 | NiFe | Nb(3.8) | Cr(3.5) | 12000 | 12.4 | 2.4 |
| 69 | NiFe | Mo(4.8) | Cr(3.5) | 12500 | 12.6 | 2.2 |
| 70 | NiFe | V(2.6) | Cr(3.5) | 11500 | 13.2 | 2.6 |
| 71 | NiFe | W(1.7) | Cr(3.5) | 12000 | 11.8 | 1.9 |
| 72 | NiFe | Ti(2.7) | Cr(3.5) | 14400 | 12.2 | 2.0 |
| 73 | NiFe | Zr(1.9) | Cr(3.5) | 16300 | 12.7 | 2.8 |
| 74 | NiFe | Hf(2.4) | Cr(3.5) | 12500 | 13.1 | 2.2 |
| 75 | NiFe | Ta(3.2) | Cr(3.5) | 10100 | 13.3 | 1.8 |
| 76 | NiFe | Nb(3.4) | Rh(5.0) | 11500 | 12.1 | 3.1 |
| 77 | NiFe | Mo(4.6) | Rh(5.0) | 16300 | 11.4 | 1.3 |
| 78 | NiFe | V(2.4) | Rh(5.0) | 13400 | 11.8 | 1.4 |
| 79 | NiFe | W(1.8) | Rh(5.0) | 15400 | 12.2 | 1.9 |
| 80 | NiFe | Ti(2.6) | Rh(5.0) | 12500 | 13.6 | 2.0 |
| 81 | NiFe | Zr(1.7) | Rh(5.0) | 13900 | 12.5 | 1.6 |
| 82 | NiFe | Hf(2.2) | Rh(5.0) | 14900 | 12.7 | 2.4 |
| 83 | NiFe | Ta(3.4) | Rh(5.0) | 12500 | 12.2 | 2.4 |
| 84 | NiFe | Nb(3.2) | Os(4.1) | 13000 | 12.1 | 2.9 |
| 85 | NiFe | Mo(4.4) | Os(4.1) | 13400 | 13.1 | 2.8 |
| 86 | NiFe | V(2.2) | Os(4.1) | 11500 | 12.8 | 2.4 |
| 87 | NiFe | W(1.6) | Os(4.1) | 12500 | 11.5 | 2.2 |
| 88 | NiFe | Ti(2.1) | Os(4.1) | 12000 | 12.5 | 1.7 |
| 89 | NiFe | Zr(1.5) | Os(4.1) | 11500 | 12.2 | 2.0 |
| 90 | NiFe | Hf(2.6) | Os(4.1) | 11000 | 12.7 | 1.9 |
| 91 | NiFe | Ta(2.8) | Os(4.1) | 16800 | 14.2 | 2.5 |

TABLE 6

| | COMPOSITION | | | (111) | GMR RATIO | GMR |
|---|---|---|---|---|---|---|
| | MAIN COMPO-NENT | M (at %) | M' (at %) | PEAK INTEN-SITY | OF CHANGE (%) | SENSI-TIVITY (%/Oe) |
| EXAMPLE | | | | | | |
| 92 | NiFe | Nb(3.0) | Si(6.2) | 19200 | 14.0 | 3.1 |
| 93 | NiFe | Mo(4.1) | Si(6.2) | 18200 | 13.8 | 2.9 |
| 94 | NiFe | V(2.0) | Si(6.2) | 12500 | 12.5 | 2.6 |
| 95 | NiFe | W(1.9) | Si(6.2) | 11500 | 12.6 | 1.9 |
| 96 | NiFe | Ti(3.0) | Si(6.2) | 13400 | 12.5 | 3.2 |
| 97 | NiFe | Zr(2.0) | Si(6.2) | 14900 | 13.1 | 2.3 |
| 98 | NiFe | Hf(2.5) | Si(6.2) | 12500 | 12.8 | 2.9 |
| 99 | NiFe | Ta(3.6) | Si(6.2) | 11500 | 12.6 | 2.5 |

It is noted from these results that the intensities of fcc (111) peak obtained of the samples of the working examples were nearly five times those obtained of the samples of the comparative examples 1 to 13. It is further remarked that the samples of the working examples were improved in ratio of magnetoresistive change and in GMR sensitivity as well.

Separately, GMR heads were manufactured by using Ta, Zr, Cr, Nb, and Hf in the place of Ti as the undercoats for the relevant crystalline soft magnetic films. It was confirmed that they showed larger intensities of fcc (111) peak about three to five times than those of the samples in the comparative examples.

The magnetoresistive head of the present invention enjoys improvement in such characteristics as ratio of change in magnetoresistance because it has a crystalline soft magnetic film with large resistivity and capable of enhancing the preferred orientation disposed as an undercoat for a magnetoresistive film as described above.

What is claimed is:

1. A magnetoresistive head comprising:
   a giant magnetoresistive film having at least a pair of ferromagnetic layers opposed to each other and a nonmagnetic intermediate layer disposed between said pair of ferromagnetic layers, and
   a crystalline soft magnetic film disposed as an undercoat in contact with at least one of said pair of ferromagnetic layers,
   wherein said crystalline soft magnetic film comprises at least one element selected from the group consisting of Ni, Fe, and Co as a main component, and as minor components, at least one element M for substantially forming a grain boundary said M element selected from the group consisting of Nb, Mo, V, W, Ti, Zr, Hf and Ta, and at least one element M' for substantially forming a solid solution with said main component, said M' element selected from the group consisting of Cr, Rh, Os, Re, Si, Al, Be, Ga, and Ge.

2. The magnetoresistive head according to claim 1, wherein said crystalline soft magnetic film has a composition represented by the general formula:

$$T_{1-(x+y)}M_xM'_y$$

wherein T stands for at least one element selected from the group consisting of Ni, Fe and Co, M stands for at least one element selected from the group consisting of Nb, Mo, V, W, Ti, Zr, Hf and Ta, M' stands for at least one element selected from the group consisting of Cr, Rh, Os, Re, Si, Al, Be, Ga and Ge, and x and y stand for numerals respectively satisfying the expressions, $0.001 \leq x \leq 0.200$ and $0.01 \leq y \leq 0.200$.

3. The magnetoresistive head according to claim 1, wherein said crystalline soft magnetic film has a thickness in the range of 1 to 100 nm.

4. The magnetoresistive head according to claim 1, wherein said magnetoresistive head further comprises a nonmagnetic metal film of at least one element selected from the group consisting of Ti, Ta, Zr, Cr, Nb and Hf, as an undercoat of said crystalline soft magnetic film.

5. The magnetoresistive head according to claim 1, wherein said magnetoresistive head further comprises an amorphous magnetic layer as an undercoat of said crystalline soft magnetic film.

6. The magnetoresistive head according to claim 1, wherein said crystalline soft magnetic film has a coercive force of less than 800 A/m.

7. The magnetoresistive head according to claim 1, wherein said ferromagnetic layer disposed on said crystalline soft magnetic film comprises a fcc (111) oriented ferromagnetic layer.

8. The magnetoresistive head according to claim 1, wherein said ferromagnetic layer disposed on said crystalline soft magnetic film comprises Co or a Co alloy.

9. The magnetoresistive head according to claim 8, wherein said Co alloy comprises a CoFe alloy.

10. The magnetoresistive head according to claim 9, wherein said CoFe alloy has a composition represented by the general formula $Co_{100-a}Fe_a$, wherein a stands for an atomic % and is a number satisfying $0<a \leq 50$.

11. The magnetoresistive head according to claim 10, wherein a is a number satisfying $5 \leq a \leq 40$.

12. The magnetoresistive head according to claim 1, wherein said main component of crystalline soft magnetic film comprises a NiFe alloy.

13. The magnetoresistive head according to claim 12, wherein said NiFe alloy has a composition represented by the general formula $Ni_{100-b}Fe_b$, wherein b stands for an atomic % and is a number satisfying $0<b \leq 50$.

14. The magnetoresistive head according to claim 13, wherein a is a number satisfying $10 \leq b \leq 40$.

15. A magnetoresistive head comprising:
   an anisotropic-magnetoresistive film; and
   a crystalline soft magnetic film disposed in contact directly with said anisotropic-magnetoresistive film or indirectly through a nonmagnetic film as an undercoat of said anisotropic-magnetoresistive film,
   wherein said crystalline soft magnetic film comprises at least one element selected from the group consisting of Ni, Fe and Co as a main component, and as minor components, at least one element M for substantially forming a grain boundary said M element selected from the group consisting of Nb, Mo, V, W, Ti, Zr, Hf, and Ta, and at least one element M' for substantially forming a solid solution with said main component, said M' element selected from the group consisting of Cr, Rh, Os, Re, Si, Al, Be, Ga and Ge.

16. The magnetoresistive head according to claim 15, wherein said crystalline soft magnetic film has a composition represented by the general formula:

$$T_{1-(x+y)}M_xM'_y$$

wherein T stands for at least one element selected from the group consisting of Ni, Fe and Co, M stands for at least one element selected from the group consisting of Nb, Mo, V, W, Ti, Zr, Hf and Ta, M' stands for at least one element selected from the group consisting of Cr, Rh, Os, Re, Si, Al, Be, Ga and Ge, and x and y stand for numerals respectively satisfying the expressions, $0.001 \leq x \leq 0.200$ and $0.01 \leq y \leq 0.200$.

17. The magnetoresistive head according to claim 15, wherein said crystalline soft magnetic film has a thickness in the range of 1 to 100 nm.

18. The magnetoresistive head according to claim 15, wherein said magnetoresistive head further comprises a nonmagnetic metal film of at least one element selected from the group consisting of Ti, Ta, Zr, Cr, Nb and Hf, as an undercoat of said crystalline soft magnetic film.

19. The magnetoresistive head according to claim 15, wherein said magnetoresistive head further comprises an amorphous magnetic layer as an undercoat of said crystalline soft magnetic film.

20. A magnetoresistive device comprising:
   a laminated film comprising first and second ferromagnetic layers and a nonmagnetic layer disposed between said first and second ferromagnetic layers, and
   a magnetic film of a NiFe alloy disposed on said laminated film in contact with one of said first and second ferromagnetic layers,
   wherein said one of first and second ferromagnetic layers comprises Co or a Co alloy, and said NiFe alloy comprises, as minor components, at least one element M for substantially forming a grain boundary, said M element selected from the group consisting of Nb, Mo, V, W, Ti, Zr, Hf and Ta, and at least one element M' for substantially forming a solid solution with said main component, said M' element selected from the group consisting of Cr, Rh, Os, Re, Si, Al, Be, Ga and Ge.

21. The magnetoresistive device according to claim 20, wherein said NiFe alloy further comprises Co.

22. The magnetoresistive device according to claim 20, wherein said NiFe alloy has a composition represented by the general formula:

$$T_{1-(x+y)}M_xM'_y$$

wherein T stands for Ni and Fe, M stands for at least one element selected from the group consisting of Nb, Mo, V, W, Ti, Zr, Hf and Ta, M' stands for at least one element selected from the group consisting of Cr, Rh, Os, Re, Si, Al, Be, Ga and Ge, and x and y stand for numerals respectively satisfying the expressions, $0.001 \leq x \leq 0.200$ and $0.01 \leq y \leq 0.200$.

23. The magnetoresistive device according to claim 22, wherein T has a composition represented by the general formula $Ni_{100-b}Fe_b$, wherein b stands for an atomic % and is a number satisfying $0 < b \leq 50$.

24. The magnetoresistive device according to claim 20, wherein said one of first and second ferromagnetic layers comprises a fcc (111) oriented film of Co or a Co alloy.

25. The magnetoresistive device according to claim 24, wherein said Co alloy has a composition represented by the formula of $Co_{100-1}Fe_a$, wherein a stands for an atomic % and is a number satisfying $5 \leq a \leq 40$. (a: atomic %, $5 \leq a \leq 40$).

26. The magnetoresistive device according to claim 20, wherein said magnetoresistive device further comprises a nonmagnetic metal film of at least one element selected from the group of Ti, Ta, Zr, Cr, Nb and Hf, as an undercoat of said magnetic film.

27. The magnetoresistive device according to claim 20, wherein said magnetoresistive device further comprises an amorphous magnetic layer as an undercoat of said magnetic film.

28. The magnetoresistive head according to claim 20, wherein said giant magnetoresistive film is a spin valve film.

29. The magnetoresistive head according to claim 20, wherein said magnetic film of said NiFe alloy is in contact with a signal magnetic field responding layer, where said signal magnetic field responding layer is the first ferromagnetic layer of said laminated film.

30. The magnetoresistive head according to claim 29, wherein said laminated film is a spin valve film.

31. A magnetoresistive head comprising:

a giant magnetoresistive film having at least a pair of ferromagnetic layers opposed to each other and a nonmagnetic intermediate layer disposed between said pair of ferromagnetic layers, one of the ferromagnetic layers being composed of a first ferromagnetic layer whose magnetization moves freely; and a crystalline soft magnetic film disposed as an undercoat in contact with said first ferromagnetic layer, wherein said crystalline soft magnetic film comprises at least one element selected from the group consisting of Ni, Fe and Co as a main component, and as minor components, at least one element M for substantially forming a grain boundary, said M element selected from the group consisting of Nb, Mo, V, W, Ti, Zr, Hf, and Ta, and at least one element M' for substantially forming a solid solution with said main component, said M' element selected from the group consisting of Cr, Rh, Os, Re, Si, Al, Be, Ga and Ge.

* * * * *

UNITED STATES PATENT AND TRADEMARK OFFICE
CERTIFICATE OF CORRECTION

PATENT NO. : 5,796,560
DATED : Augst 18, 1998
INVENTOR(S) : Kazuhiro Saito et al It is certified that error appears in the above-identified patent and that said Letters Patent is hereby corrected as shown below:

Claim 1, column 17, line 20, after "boundary" insert --,--.

Claim 2, column 17, line 37, "$0.001 \leq \times \leq 0.200$" should read --$0.001 \leq x \leq 0.200$--.

Claim 16, column 18, line 39, "$0.001 \leq \times \leq 0.200$" should read --$0.001 \leq x \leq 0.200$--.

Claim 22, column 19, line 14, "$0.001 \leq \times \leq 0.200$" should read --$0.001 \leq x \leq 0.200$--.

Claim 25, column 19, line 23, "$Co_{100-1}Fe_a$" should read --$Co_{100-a}Fe_a$--.

Signed and Sealed this

Seventeenth Day of August, 1999

Q. TODD DICKINSON

Attest:

Attesting Officer

Acting Commissioner of Patents and Trademarks